United States Patent [19]

Nichols

[11] 4,418,839
[45] Dec. 6, 1983

[54] METER CONTROLLED DISPENSING APPARATUS

[75] Inventor: Jimmy B. Nichols, Statesboro Township, Bulloch County, Ga.

[73] Assignee: Emerson Electric Co., St. Louis, Mo.

[21] Appl. No.: 278,891

[22] Filed: Jun. 29, 1981

[51] Int. Cl.³ .............................................. B67D 5/30
[52] U.S. Cl. ...................................... 222/14; 222/20; 137/486; 137/489; 137/492.5
[58] Field of Search ...................... 222/14, 15, 16, 20, 222/17; 137/486, 489, 492.5; 251/25

[56] References Cited

U.S. PATENT DOCUMENTS 2,865,395 12/1958 Fields ................................. 137/486
3,724,808 4/1973 Sugden, Jr. ........................ 222/20 X
4,106,670 8/1978 Takeda ................................. 222/20

Primary Examiner—Joseph J. Rolla
Assistant Examiner—Michael S. Huppert
Attorney, Agent, or Firm—Charles E. Markham

[57] ABSTRACT

A main hydraulically operated valve body has a valve element therein which is biased closed when inlet pressure is applied to both sides thereof and is moved openward when inlet pressure is variably exhausted from its outlet side through a pilot valve having a body rigidly mounted on a casing enclosing a meter actuated preset mechanism. The pilot valve body has a single valve element therein connected to the preset mechanism for preventing and controlling exhaustion of inlet pressure therethrough and conduit connects the main and pilot valve bodies.

5 Claims, 9 Drawing Figures

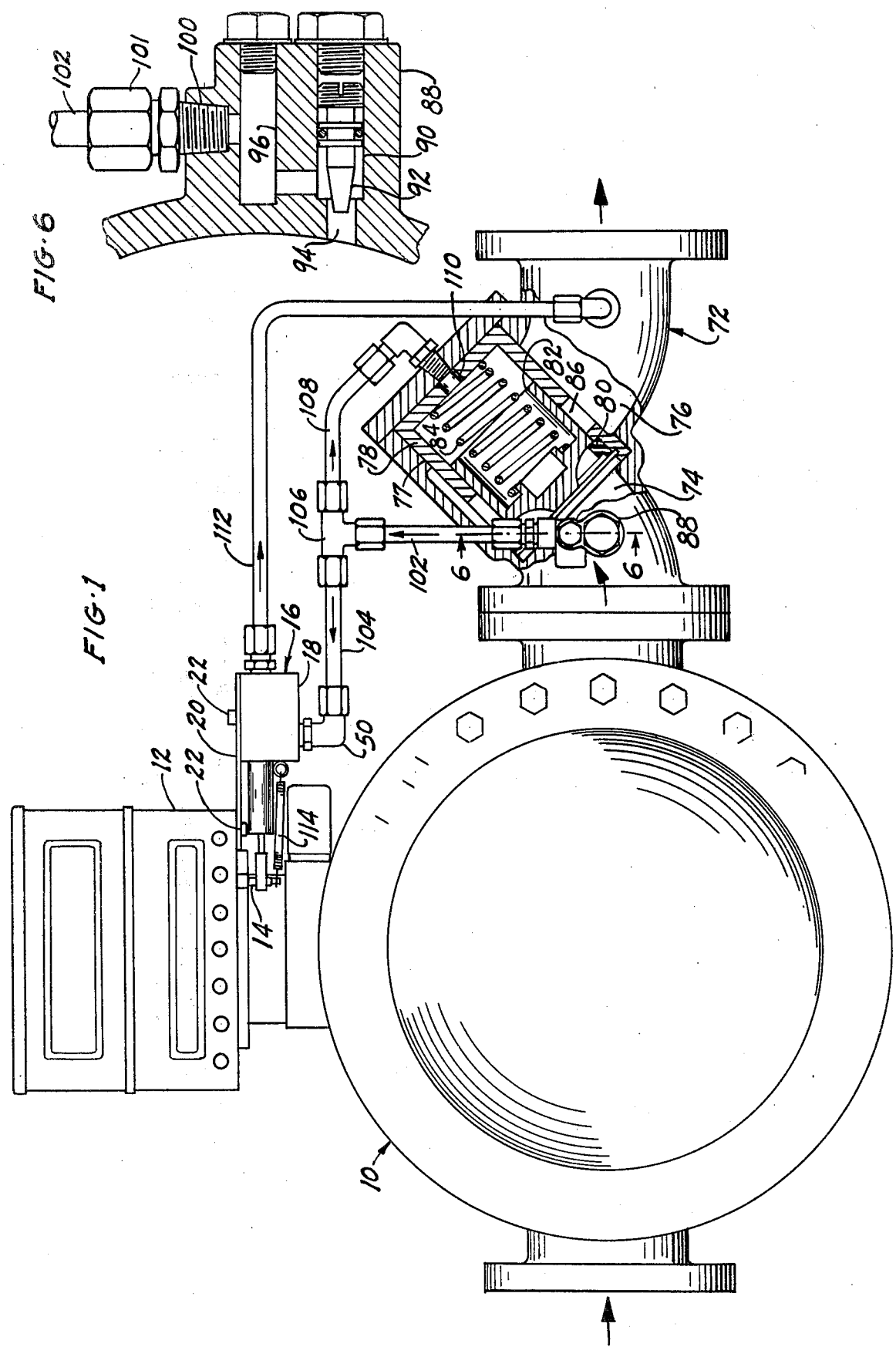

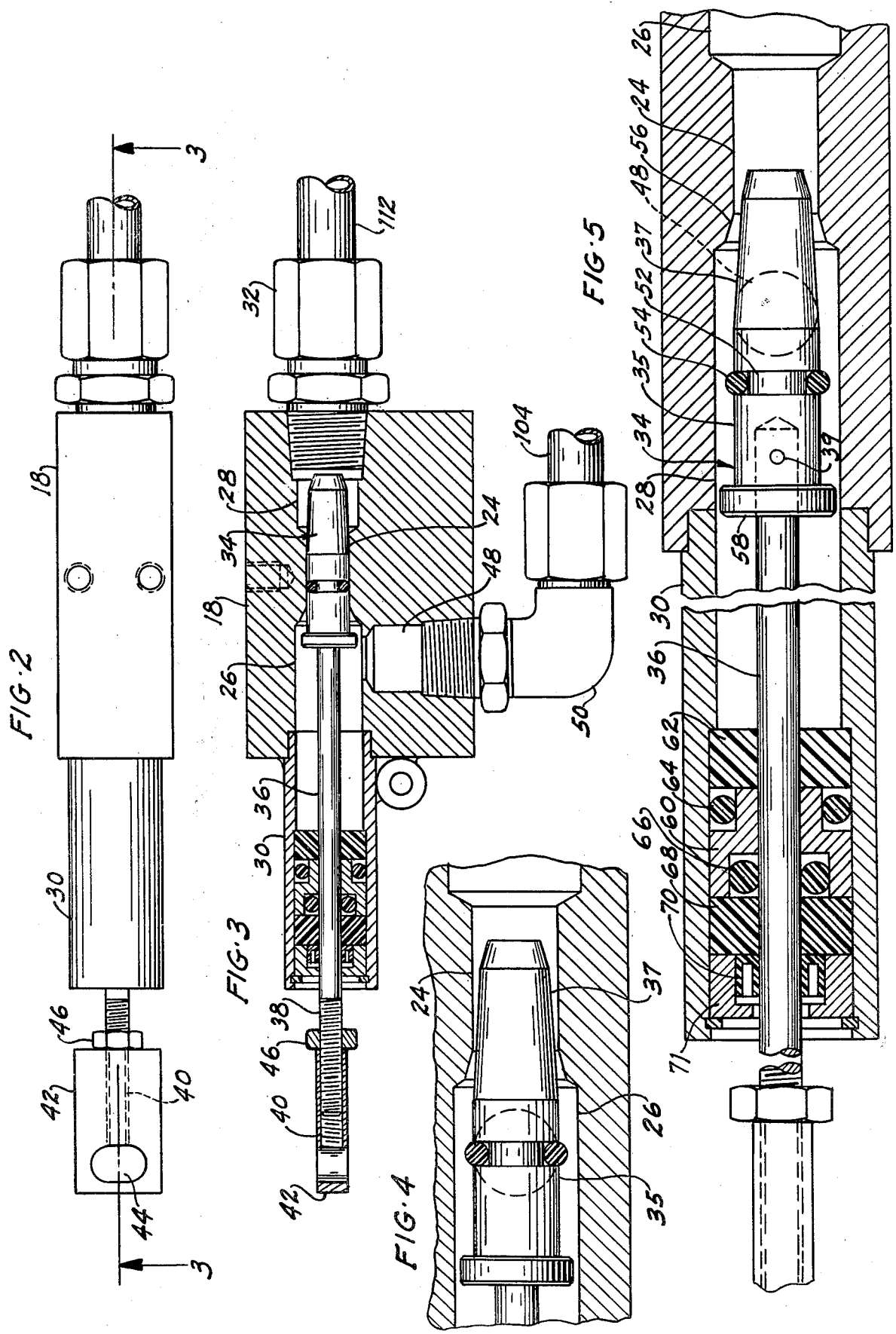

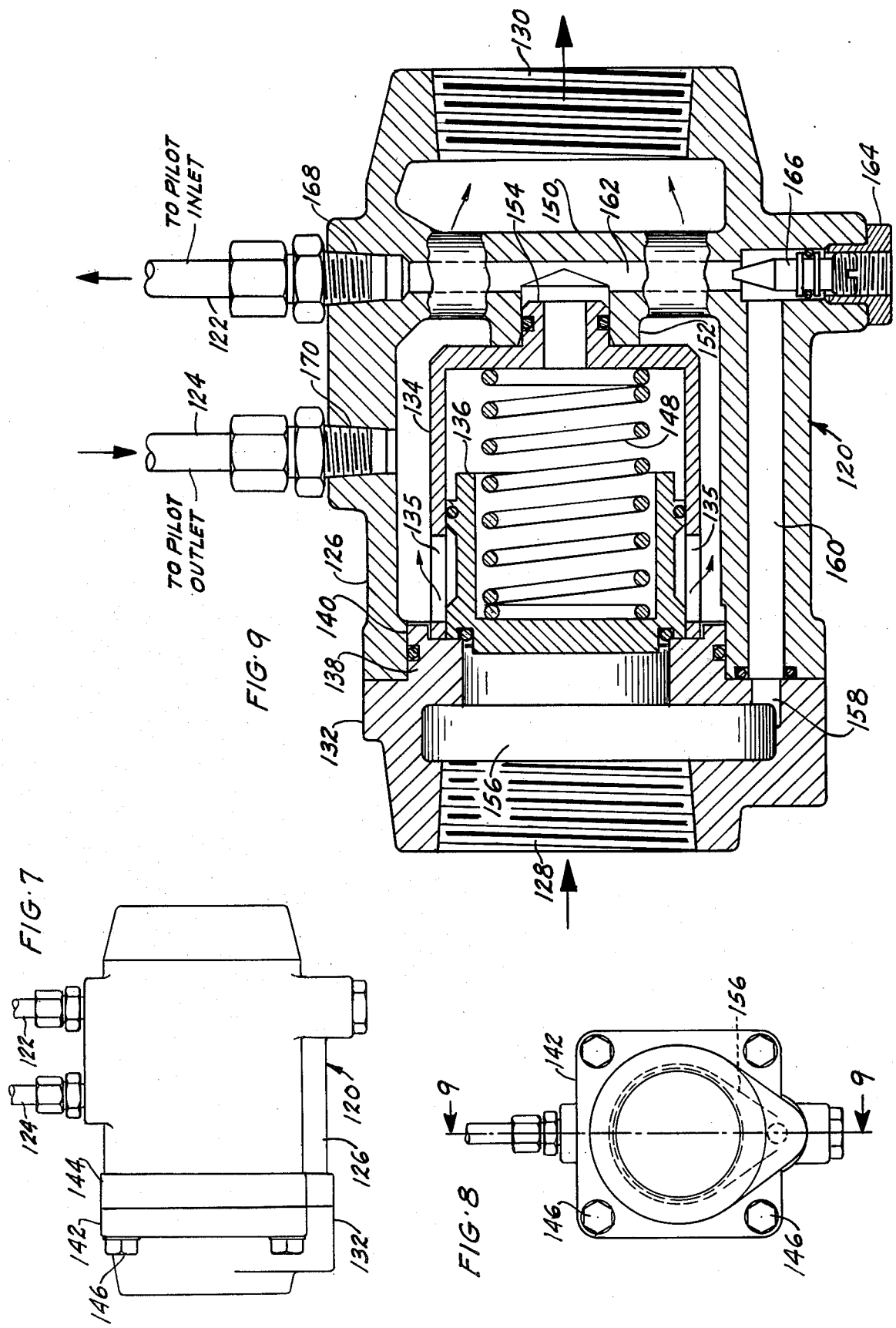

METER CONTROLLED DISPENSING APPARATUS

This invention relates generally to meter controlled systems for dispensing a predetermined quantity of liquid and particularly to pilot valves and main valves and their construction and arrangement in such systems.

BACKGROUND OF THE INVENTION

The use of meter actuated pilot valves for the relayed operation of main flow control valves and the advantages achieved thereby are well known and understood. In systems capable of dispensing a predetermined amount of liquid, wherein a flowmeter actuates a pilot valve to effect closure of the main valve when a predetermined quantity of liquid has been delivered, it is frequently essential particularly when delivery is made at high flow rates to stage the closure of the main control valve. One reason for this is to minimize the shock which would otherwise occur if the main valve were to be suddenly completely closed from a full open, high flow rate position and another reason is to permit effecting a more precise cutoff at the instant a predetermined amount has been delivered.

Various pilot and main valve constructions and their arrangements in such systems have been proposed. In some prior arrangements the pilot valve is mounted on or incorporated within the main valve body and mechanically connected to flowmeter actuated preset mechanism spaced therefrom by linkage. In other prior arrangements solenoids are employed to operate pilot valves which solenoids are energized through meter actuated switching means.

The mechanical connection of a pilot valve to meter actuated preset mechanism when considerably spaced therefrom by linkage introduces the potential for inaccuracies in the precise motion transmission required and the necessary frequent adjustment thereof to maintain an acceptable degree of accuracy has been found troublesome. The solenoid operation of pilot valves substantially increases the cost when staged closure of the main valve is required because multiple solenoid operated valves are required to stage the closure of the main valve. Moreover, solenoid operation of the pilot valves requires a suitable source of electrical power which is not always available.

OBJECTS OF THE INVENTION

An object of the invention is to provide generally new and improved apparatus for accurately dispensing a predetermined quantity of liquid which overcomes the aforestated disadvantages of prior apparatus for this purpose and which is reliable in operation, convenient to adjust and of relatively simple and economical construction.

A further object is to provide a pilot valve and a main valve spaced from the pilot valve and arranged to be operated hydraulically thereby and connected to the pilot valve by tubing.

A further object is to provide a pilot valve arranged to be mounted on a casing enclosing flowmeter actuated preset mechanism and operatively connected to the preset mechanism and a main valve for controlling flow through the flowmeter and arranged to be operated hydraulically by the pilot valve and connected thereto by tubing.

A further object is to provide a pilot valve for the hydraulic operation of a main valve in which a pilot valve element reciprocatable in an orifice may be selectively positioned or moved therein to positions which respectively effect single or multi-staged closure of the main valve.

A further object is to provide a biased closed main valve arranged to be opened by inlet pressure applied to one side thereof and having adjustably restricted passageway means in the body thereof for applying sufficient inlet pressure to the other side of the valve thereby to effect with biasing means its closure and including means in the body thereof for the detachable connection of tubing thereto through which inlet pressure applied to the other side of the valve may be variably exhausted to the body outlet thereby to permit opening of the valve.

These and further objects and advantages will appear when reading the following descriptions when read in connection with the accompanying drawings.

IN THE DRAWINGS

FIG. 1 is a side elevational view of a pilot valve constructed in accordance with the present invention shown mounted on and mechanically connected to a currently manufactured flowmeter and having fluid conduit connections with a currently manufactured main valve;

FIG. 2 is an enlarged top plan view of the pilot valve shown in FIG. 1;

FIG. 3 is a longitudinal cross-sectional view of the pilot valve shown in a fully closed position and is taken along line 3—3 of FIG. 2.

FIGS. 4 and 5 are further enlarged fragmentary longitudinal cross-sectional views of the pilot valve showing the valve in progressively open positions;

FIG. 6 is an enlarged fragmentary cross-sectional view of the main valve shown in FIG. 1, showing the adjustable needle valve and is taken along line 6—6 of FIG. 1.

FIG. 7 is a side elevational view of a second form of a main valve constructed in accordance with the present invention;

FIG. 8 is an inlet end elevational view of the valve shown in FIG. 7; and

FIG. 9 is an enlarged cross-sectional view of the main valve shown in FIGS. 6 and 7.

DESCRIPTION OF THE APPARATUS SHOWN IN FIGS. 1 TO 6

Referring to FIG. 1, a presently manufactured, "Brooks," flowmeter generally indicated at 10 has a presently manufactured "Veeder-Root" presettable mechanism enclosed in a casing 12 and includes a downwardly extending round actuator pin 14. A pivot valve generally indicated at 16 has a body 18 rigidly mounted on casing 12 by means of a horizontal plate 20 and screws 22. Referring to FIGS. 2 to 5, the pilot valve body 18 has a horizontal bore extending therethrough which includes a smaller diameter intermediate portion thereof forming an elongated orifice 24, and larger diameter end portions 26 and 28 extending leftward and rightward therefrom. A tube 30 coaxial with the bore in body 18 and having an inside diameter substantially the same as bore portion 26 has an inner end thereof fixed to the left side of body 18 as by shouldering and welding. The right end portion 28 of the bore forms the outlet of the pilot valve and is suitably counterbored and screw threaded to receive conventional straight tube attaching means 32. There is also a bore 48 extending into body 18 perpendicular to and intersecting bore portion 26 and forming the inlet of the pilot valve. Bore 48 is suitably screw threaded to receive a conventional ell and suitable tube attaching means 50.

Arranged for reciprocating in the elongated orifice 24 is an elongated round valve element 34 having a coaxial stem 36 connected to the left end thereof by a pin 39. Stem 36 extends leftward through tube 30 and projects from the outer end thereof. The projecting end portion of stem 36 is screw threaded at 38 and is threadedly received in a screw threaded bore 40 in a coupling member 42. Coupling 42 has an ovate aperture 44 therein arranged to fittingly receive the round actuator pin 14 of the presettable meter actuated mechanism. The aperture 44 is elongated so as to accommodate an arcuate swing of the round actuator pin 14. The coupling 42 is therefore screw threadedly adjustable on stem 36 and provides fine axial adjustment between valve element 34 and round actuator pin 14 and there is a jum nut 46 on stem 36 for fixing coupling 42 in adjusted position on stem 36. It will be seen therefore that a single, longitudinally adjustable and relatively short member operatively connects valve element 34 with actuator pin 14.

The elongated valve element 34 comprises a lefthand cylindrical portion 35, which is in the order of a few thousandths of an ince smaller in diameter than the elongated orifice 24, and a gradually tapered right-hand portion 37 converging rightwardly therefrom. There is an annular groove 52 in the cylindrical portion 35 of valve element 34 which receives a relatively soft rubberlike O-ring 54. When cylindrical portion 35 of the valve element is entered into the orifice 24, as shown in FIG. 3, the O-ring 54 is distorted and orifice 24 is effectively closed to the passage of any liquid therethrough. There is a short tapered portion 56 of the bore between portion 26 and orifice 24 which facilitates the gradual distortion of the O-ring as it is entered into orifice 24. A round collar 58 formed on the left end of valve element 34 loosely fits the bore portion 26 and maintains essentially axial alignment of the valve element 34 in the bore. The valve stem 36 is closely guided in tube 30 by two bushings 62 and 68 for coaxial movement with respect to orifice 24 and the outer end portion of the tube is sealed against liquid escape by longitudinally spaced pliable sealing elements 64, 66, retaining in a gland ring 60 and 70 retained in a ring 71.

Connected to the right-hand side of flowmeter 10 and controlling the flow therethrough is a presently manufactured main valve generally indicated at 72. Valve 72 has an inlet passage 74, an outlet passage 76 and an intermediate cylindrical chamber 77 formed in the body thereof. A hollow cylindrical liner 78 fixed in cylindrical chamber 77 has an open end adjacent the end of inlet passage 74 wherein is fixed a valve seat 80 and an opposite closed end. A hollow cylindrical valve element 82 arranged for slidable reciprocation in liner 78 has a closed end cooperating with valve seat 80 to control flow from inlet 74 to outlet 76. Valve element 82 has an opposite open end and is biased toward seat 80 by a spring 84. The liner 78 has lateral ports 86 therein adjacent seat 80 which provide communication between the interior of liner 78 and outlet passage 76 when valve element 82 is open.

Referring to FIG. 6 a boss 88 on the body of main valve 72 has a screw threaded bore 90 intersecting inlet passage 74 and receiving a threadedly adjustable needle valve 92 which cooperates with a port 94 at the inner end of bore 90. The boss 88 also has a bore 96 parallel with and in communication with bore 90 which receives a suitable filter element (not shown). Boss 88 is further provided with a bore 100 perpendiclar to and intersecting bore 96 which is counterbored and suitably screw threaded to receive suitable tube attaching means 101. The inlet passage 74 of the main valve 72 is therefore in communication with the bore portion 26 of the pilot valve body 18 via port 94, bore 100, tubing sections 102 and 104, T fitting 106, L fitting 50 and pilot inlet passage 48. The interior of liner 78 is also in communication with main valve inlet passage 74 via the T fitting 106, tubing section 108 and an aperture 110 in the closed end of the liner 78. The outlet 28 of the pilot valve is in communication with the outlet passage 76 of the main valve via a tubing section 112 and a port (not shown) in the wall of the main valve defining the main valve outlet passage.

Operation of the Pilot and Main Valves Shown in FIGS. 1 to 6

When pilot valve element 34 is positioned so that the cylindrical portion 35 thereof is entered into elongated orifice 24, as shown in FIG. 3, no flow through the pilot valve will occur. When the pilot valve is in this closed position, and there is upstream fluid pressure on the inlet side of the main valve element 82, substantially equal fluid pressure will be applied to both sides of the main valve and the bias of spring 84 is sufficient to close the main valve as shown in FIG. 1.

To partially open the main valve from a fully closed position or to partially close it from a fully open position the pilot valve is partially opened as for example as shown in FIG. 4, thereby to reduce the fluid pressure in the interior of liner 78 while yet maintaining a predominent fluid pressure on the inlet side of valve element 82. Inasmuch as the tapered portion of pilot valve element 34 and the bias of spring 84 are constant, variations in inlet pressure may be compensated for by adjustment of needle valve 92 in port 94 so that a predetermined position of pilot valve element 34 will result in a substantially corresponding throttling position of the main valve.

When pilot valve 18 is connected to a meter actuated preset mechanism as shown in FIG. 1 and a predetermined quantity of liquid is to be dispensed at a high flow rate the coupling member 42 is adjusted on the pilot valve stem 36 so that a finite leftward movement of the actuator pin 14 to a preset position will open the pilot valve sufficiently, as in FIG. 5, to effect opening of the main valve to a high flow rate position. When a quantity of liquid approaching the predetermined quantity to be dispensed has passed through meter 10 the preset mechanism is so constructed that it will be tripped allowing a spring 114 connected to pin 14 and to the pilot body 18 to move the pin 14 rightward a predetermined amount partially closing the pilot valve and effecting a staged or partial closure of the main valve to substantially reduce the flow rate. When subsequently the predetermined quantity to be dispensed has passed through the meter the meter actuated preset mechanism is so constructed that the actuator pin 14 will be moved further rightward sufficiently to fully close the pilot valve and consequently the main valve.

It will be seen that pilot valve 16 is adaptable to connection with other preset mechanisms operative to effect either single or multistaged closure of a main valve and is conveniently adjustable to vary a throttling position of a main fluid pressure operated valve. When pilot valve 16 is connected to a preset mechanism of the type having a single positive movement effecting its closure the spring 114 connecting preset actuator pin 14 to the pilot body may be deleted.

Description of the Main Valve Shown in FIGS. 7 to 9

A main hydraulically operated valve constructed in accordance with the present invention and generally indicated at 120 in FIGS. 7 to 9 is arranged to be connected to the inlet and outlet sides of the meter actuated pilot valve 16 by tubing sections 122 and 124 respectively thereby to dispense a predetermined quantity of liquid. Valve 120 has a hollow generally cylindrical body 126 having inlet and outlet end walls with aligned and suitably screw threaded inlet and outlet passages 128 and 130 therein. The body 126 has a separable, detachably connected inlet section 132 embodying the inlet passage 128 and inlet end wall. The separable inlet section 132 permits the insertion into the valve body of a hollow cylindrical liner member 134 having a closed end and an open end and a hollow cylindrical valve element 136 having a closed end and an open end and arranged for sliding reciprocation in liner 134. Inlet section 132 has a short hollow cylindrical portion 138 fitted into a bore 140 in the main body portion and the inner end of portion 138 forms the inlet end wall. Inlet section 132 and the main body portion have meeting flanges 142 and 144 connected by cap screws 146.

The liner member 134 has its open end abutting the end of portion 138 and the valve element 136 when closed has its closed end seating on the end of portion 138. The liner 134 is of smaller outside diameter than the inside diameter of hollow body 126 and is provided with ports 135 in the sidewall thereof adjacent its open end thereby to provide communication between inlet 128 and outlet 130 when valve element 136 is moved openward. A spring 148 between the closed ends of liner 134 and valve element 136 biases the valve element toward a closed position. Extending diametrically cross hollow body 126 adjacent the outlet 130 is an integrally formed bar 150 having a laterally projecting hollow boss 152 thereon which fittingly receives a hollow cylindrical boss 154 projecting outwardly from the closed end of liner 134 thereby to fixedly mount the liner 134 in valve body 126.

Communication between the inlet 128 and the space between the closed ends of liner 134 and valve 136 is provided by a generally annular groove 156 in the inner wall of inlet section 132 and a short horizontal passage 158, a passage 160 in a rib portion extending along one side of the body 126, a passage 162 extending through bar 150 and the hollow boss 154. The passage 162 extends through the body 126 from its lower to upper sides, in FIG. 9, and is counterbored and screw threaded at its lower end to receive a hollow externally and internally threaded nut 164. Nut 164 screw threadedly receives and adjustable needle valve 166 for variably restricting the passage 162. At its upper end passage 162 is counterbored and screw threaded at 168 to receive suitable connecting means for tubing section 122 leading to the inlet of pilot valve 16.

There is also a bore and counterbore 170 in the upper wall of body 126 which is screw threaded to receive suitable connecting means for tubing section 124 leading to the outlet of pilot valve 16. The bore 170 provides communication between the outlet of the pilot valve and the outlet 130 of the valve 126 via tubing section 124 and the annular space around liner member 134. Suitable pliable O-rings are provided where shown.

Operation of the Main Valve Shown in FIGS. 7 to 9

The operation of the main valve 120 when operatively connected to pilot valve 16 by tubing is similar to that of the presently manufactured valve 72 shown in FIG. 1. That is to say, when pilot valve 16 is closed any fluid pressure at inlet 128 will be equally applied to both sides of the closed end of valve element 136 and spring 148 will, under this condition, effect its closure. When pilot valve 16 is moved openward a drop in pressure within liner 134 will occur thereby causing the valve 136 to move openward under fluid pressure on its inlet side.

I claim:

1. In apparatus for dispensing a predetermined quantity of liquid wherein a hydraulically operated main valve has a valve body and a valve element therein which is biased closed when inlet pressure is applied equally to both sides thereof and is moved openward by inlet pressure as the inlet pressure on its downstream side is progressively exhausted downstream of the valve element through a pilot valve operatively connected to a meter actuated preset mechanism; the improvement which consists in providing a pilot valve having a body spaced from said main valve and rigidly mounted on a casing enclosing said meter actuated preset mechanism, said pilot body having an inlet and an outlet and a single valve element therein operatively connected to said preset mechanism and movable thereby to three discriminate positions i.e., a first closed position in said pilot body in which no inlet pressure applied to the outlet side of said main valve element is exhausted therethrough, a second open position in which sufficient inlet pressure being applied to the outlet side of said main valve element is exhausted therethrough to effect full opening of said main valve element, and a third partially open position in which just sufficient inlet pressure is exhausted therethrough to effect a partial opening of said main valve element, and in connecting the pilot valve body to the body of said main valve body by detachably connected conduits thereby to provide communication between said main and pilot valves.

2. The apparatus claimed in claim 1 in which the operative connection of said single pilot valve element with said preset mechanism includes a member therebetween providing screw threaded adjustment of said connection.

3. The apparatus claimed in claim 1 in which said pilot valve body has an orifice therein between said inlet and outlet and in which said single pilot valve element is arranged to move coaxially in said orifice, and in which said pilot valve element has a cylindrical portion for blocking any flow through said orifice when positioned therein and a tapered portion for varying the flow therethrough when moved coaxially therein.

4. The apparatus claimed in claim 1 in which said pilot valve body has an elongated orifice therein between said inlet and outlet and in which said pilot valve element includes a cylindrical portion and a tapered portion and is arranged to be moved coaxially in said orifice, and said cylindrical portion being of such diameter that it is freely movable longitudinally in said orifice and having a soft rubberlike O-ring fitted in an annular groove in the periphery thereof of such diameter that it is substantially compressed into said groove when said cylindrical portion is moved longitudinally into said orifice thereby to block any flow therethrough.

5. The apparatus claimed in claim 1 which includes passageway means providing communication between said inlet and outlet sides of said main valve element and means for variably restricting the flow through said passageway means.

* * * * *